United States Patent [19]

Linaburg

[11] Patent Number: 4,537,416

[45] Date of Patent: Aug. 27, 1985

[54] TRAILER HITCH ALIGNMENT DEVICE

[76] Inventor: Clyde P. Linaburg, Rte. 2, Box 493, Luray, Va. 22835

[21] Appl. No.: 580,197

[22] Filed: Feb. 15, 1984

[51] Int. Cl.³ .............................................. B60D 1/00
[52] U.S. Cl. .................................. 280/478 R; 280/3; 280/28.5; 254/94; 254/420
[58] Field of Search ...................... 280/1, 3, 28.5, 427, 280/475, 476 R, 477, 478 R, 478 A, 478 B; 172/272, 677, 679; 254/94, 420

[56] References Cited

U.S. PATENT DOCUMENTS

| | | | |
|---|---|---|---|
| 2,786,690 | 3/1957 | Tharp | 280/3 |
| 3,084,953 | 4/1963 | McGregor | 280/764.1 |
| 3,482,847 | 12/1969 | Hart | 280/3 |
| 3,738,672 | 6/1973 | Dalton | 280/3 |
| 3,740,077 | 6/1973 | Williams | 280/475 |
| 3,807,767 | 4/1974 | Moline | 280/477 |
| 3,944,259 | 3/1976 | Miller | 280/475 |
| 4,431,208 | 2/1984 | Geeves | 280/477 X |

Primary Examiner—Joseph F. Peters, Jr.
Assistant Examiner—Charles R. Watts
Attorney, Agent, or Firm—Dennison, Meserole, Pollack & Scheiner

[57] ABSTRACT

A trailer hitch alignment device comprising an upwardly directed generally arcuate cradle with a vertically elongated tubular socket pivotally mounted therein. The socket receives the lower end of a trailer jack shaft. A locking pin selectively locks the socket to the cradle to preclude relative movement therebetween. Removal of the lock pin allows a rocking of the cradle and a corresponding shifting of the jack shaft and associated trailer. The cradle includes multiple upwardly directed handle receiving pockets.

11 Claims, 11 Drawing Figures

U.S. Patent   Aug. 27, 1985   Sheet 2 of 2   4,537,416

TRAILER HITCH ALIGNMENT DEVICE

BACKGROUND OF THE INVENTION

The invention is broadly concerned with trailer hitches, and more particularly with the alignment of a trailer-mounted hitch component with the corresponding component on a tow vehicle.

When a trailer, for example, a recreational trailer, horse trailer, or the like, is to be hooked up to a tow vehicle, the normal procedure involves the backing of the tow vehicle in a manner which will hopefully bring the hitch components into alignment and preferably engagement. This procedure usually requires a second person guiding the driver of the tow vehicle and is frequently a trial-and-error process resulting in wasted time, frayed nerves, and possibly improperly coupled components.

Systems have been devised for facilitating the hitching procedure whereby the trailer is provided with a degree of mobility whereby an individual can physically move the trailer at least sufficiently to accommodate any reasonably closely positioned tow vehicle hitch component, basically eliminating the necessity for an exact or highly accurate alignment through manipulation of the tow vehicle itself. Examples of such known systems will be noted in the following patents:

| | |
|---|---|
| 3,084,953 | McGregor |
| 3,482,847 | Hart |
| 3,738,672 | Dalton |
| 3,740,077 | Williams |
| 3,807,767 | Moline |
| 3,944,259 | Miller |

The patents to McGregor, Hart, Dalton and Miller are representative of the relatively common expedient of providing a roller or wheel on the lower end of the jack shaft of a trailer tongue. Both Hart and Dalton use elongated handles engaged in sockets as a means for manipulating the respective rollers. Hart appears to provide no means for preventing free rotation of his wheel. Dalton provides an elaborate ratchet and pawl system wherein provision can be made, through a manipulation of the pawls, to lock the wheel against rotation.

SUMMARY OF THE INVENTION

The trailer hitch alignment device of the present invention proposes a construction which allows for a positional adjustment of the trailer tongue as desired utilizing limited incremental movement. The incremental movement is effected basically by a rolling action with specific limits on the extent of movement achieved thereby. In this manner, advantage is taken of the relatively free movement available from a wheel support, without the attendant disadvantages of, as an example, a "runaway" load because of the free rolling nature of the support, or the necessity of an elaborate construction or system for locking the wheel against movement.

The alignment device includes a cradle incorporating a generally arcuate base plate with opposed side panels. A generally vertically oriented tubular jack-receiving socket pivotally mounts between the side panels. The pivotal mounting of the jack socket allows for a rocking of the cradle, with the jack shaft engaged within the socket, and a corresponding lateral shifting of the jack shaft and the trailer therewith. The rocking of the cradle constitutes the desired incremental movement and is effected through the manipulation of an elongated handle selectively received in any one of a plurality of handle sockets rigid with the cradle. The cradle is upwardly opening and, as desired, may be provided with drainage holes. The opposed extremities of the base plate of the socket define abutment edges limiting the relative pivoting movement of the cradle relative to the socket received jack shaft. If so desired, the base plate need not be a true arc. Similarly, the axis of rotation of the jack socket, defined by a rigid pin or rod, may not be located radially equidistant from the base plate throughout the extent thereof. For example, the pivot defining rod may, as illustrated, be located at a distance upward from the center of the arcuate base plate and, at the perpendicular thereto, at a greater distance from opposed end portions of the base plate. One advantage of such an arrangement would be a slight inherent tendency to resist free rolling, particularly outward from a central point.

Additional objects and advantages of the invention will become apparent as the details of construction and manner of use of the invention are more fully hereinafter described.

DESCRIPTION OF THE PREFERRED EMBODIMENT

Figure 1:
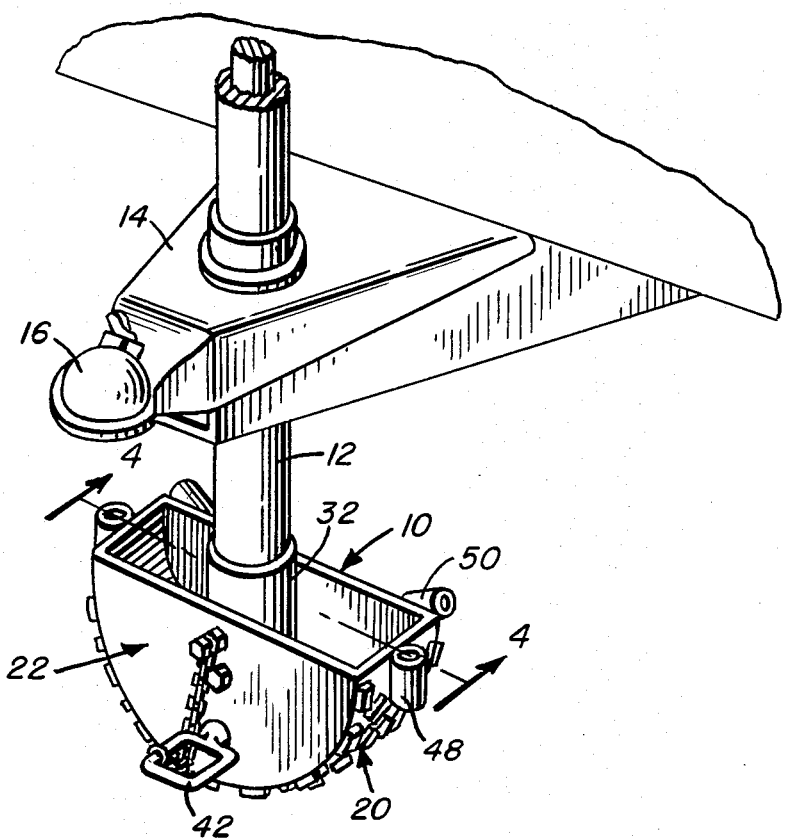
FIG. 1 is a view illustrating the alignment device mounted in operative position on the jack of a trailer tongue assembly.
Figure 2:
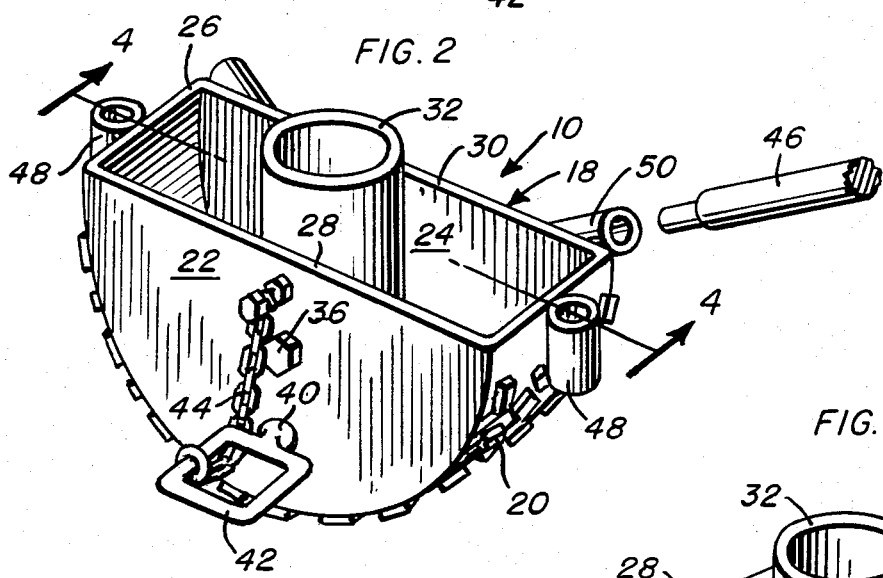
FIG. 2 is an enlarged perspective view of the device, including the associated handle.
Figure 3:
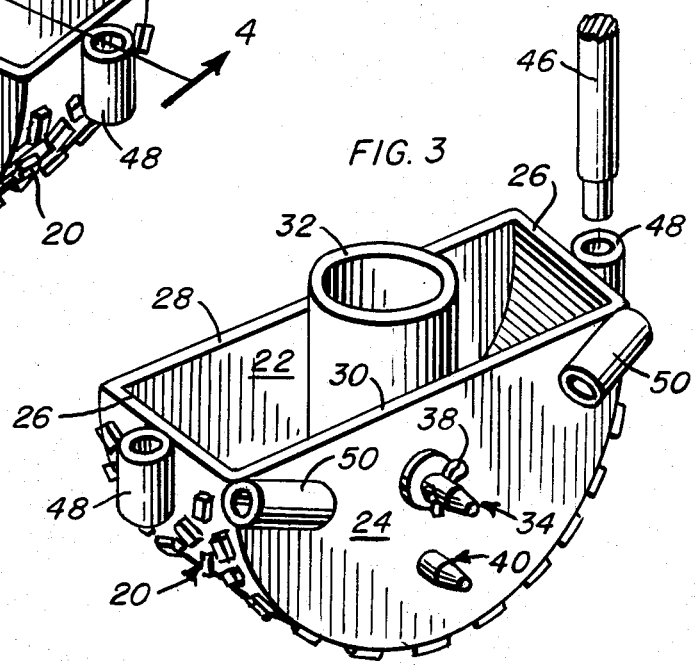
FIG. 3 is a perspective view of the device from the opposite side thereof.
Figure 4:
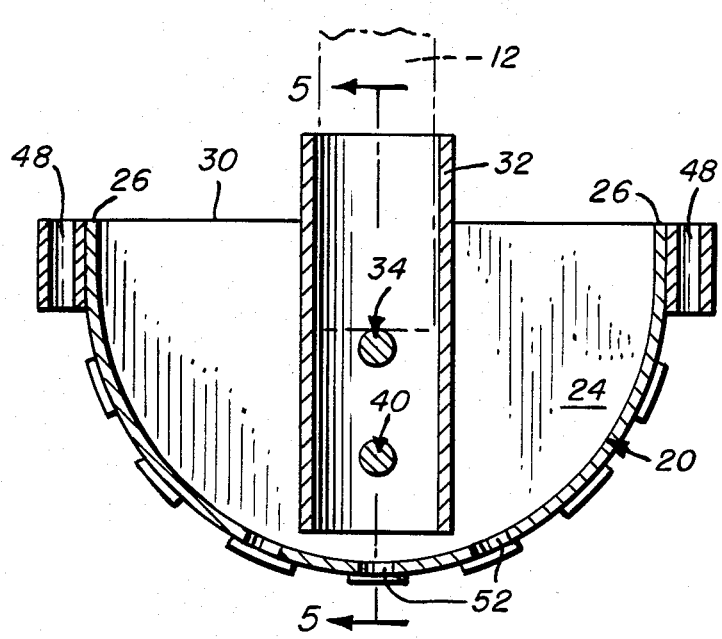
FIG. 4 is an enlarged cross sectional detail taken substantially on a plane passing along line 4—4 in FIG. 2 and illustrating the jack shaft in phantom lines.
Figure 5:
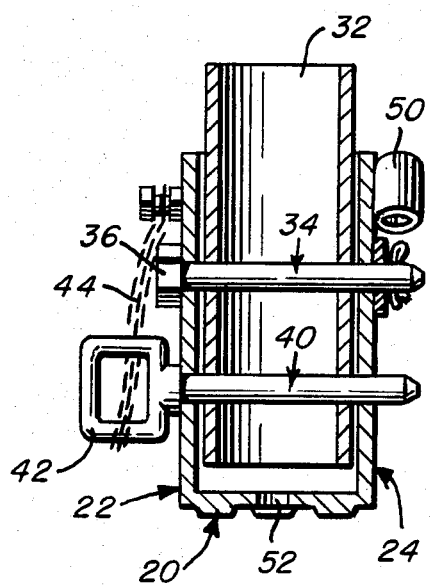
FIG. 5 is a cross sectional view taken substantially on a plane passing along line 5—5 in FIG. 4.

Referring now more specifically to the drawings, FIG. 1 illustrates the trailer hitch alignment device 10 of the invention mounted in operative position on the lower portion of a jack shaft 12 which is in turn hub mounted on and extends vertically through a conventional trailer tongue 14. The trailer tongue 14 terminates, at its forward end, in an appropriate hitch component 16, normally a hitch socket engageable over a complementary ball hitch component mounted on the tow vehicle (not illustrated).

The alignment device 10, noting the details of FIGS. 2–5 in particular, includes a rocking foot or cradle 18 defined basically by a generally arcuate base or base plate 20, having an outer traction enhancing surface, and a pair of opposed side supports generally in the nature of panels 22 and 24. For purposes of illustration and explanation, these panels will be respectively referred to as front panel 22 and rear panel 24 when differentiation therebetween is required.

The base plate 20 and side panels 22, 24 have their peripheral generally arcuate edges welded together to define a rigid integral unit having an upwardly opening top defined by the opposed end edges 26 of the base plate 20 and the top edges 28 and 30 of the respective side panels 22 and 24. These edges are coplanar and in a substantially horizontal plane upon a vertical orientation of the cradle 18 with respect to the jack shaft 12 as in FIGS. 1 and 4.

In order to accommodate the jack shaft 12, or more particularly the lower portion thereof, an elongated tubular jack socket 32 is positioned between the side panels 22 and 24. This jack socket 32 is mounted for oscillation or pivotal movement by a transverse mounting pin or rod 34, preferably provided with an enlarged head 36 on one end thereof and a releasable retainer, such as cotter pin 38, on the other end thereof for selective disassembly in an obvious manner. As will be possibly best apparent from FIG. 4, the pivot rod 34 may be positioned closer to the bottom of the base plate 20 than to the opposed vertically directed end portions thereof and, at the same time, equidistant from the opposed end portions. In connection therewith, and again noting FIG. 4 in particular, the opposed upwardly directed end portions of the base plate, immediately below the end edges 26, may project vertically in generally opposed parallel relation to each other, rather than following the arc of a true circle.

The tubular jack socket 32 terminates above the inner face of the base plate 20 a sufficient distance to allow for an unencumbered relative oscillating or pivoting of the socket 32. This socket 32 projects above the pivot point a distance sufficient to firmly receive and confine the lower portion of the jack shaft 12. The lower end of the jack shaft 12 is supported directly on the pivot defining mounting rod 34. The socket, in turn, is sized to closely slidably receive the jack shaft 12, providing a snug although releasable interfit.

In order to provide for a selective locking of the jack socket 32 against movement relative to the cradle 18, aligned holes are provided through the opposed side panels 22 and 24 and the jack socket 32 below the pivot rod 34 for the selective reception of an elongated locking pin 40. This pin will preferably have an enlarged manipulating head 42 on one end thereof and be tethered, through flexible chain 44, to the front panel 22. It will be appreciated that the holes receiving the locking pin 40 align upon an orientation of the cradle 18 with the planar edge-defined upper surface thereof substantially horizontally directed and perpendicular to the vertically extending jack 12 and jack socket 32.

The actual manipulation of the alignment device, through a rocking thereof, is effected by an elongated handle 46 selectively inserted within any one of several handle sockets welded or otherwise rigid with the cradle 18. A first pair of sockets 48 are welded, or otherwise rigidly affixed, to the outer faces of the opposed vertically directed end portions of the base plate 20. These sockets 48, in the nature of tubular sleeves, have open upper ends coplanar with the upper edges of the cradle 18, and depend a distance sufficient to stably accommodate one end of the handle 46 adapted to snugly engage therein. A second pair of sockets 50 are welded to the outer face of the rear side panel 24 and extend downwardly and inwardly from the opposed upper edge corners at generally acute angles to the upper edge 30 of this rear panel 24. These sockets 50 similarly are capable of snugly and stably receiving one end portion of the handle for manipulation of the alignment device in a manner which shall be explained presently.

Inasmuch as it is possible the device 10 will be used under wet, muddy, or otherwise adverse grounds conditions, it is particularly desirable that the sockets 48 and 50 have open lower ends for a drainage of any water or debris. Similarly, appropriate drainage holes 52 should preferably be provided at least at the low point of the arcuate base plate 20. Further, while the side panels 22 and 24 have been illustrated as solid members, these can, for purposes of drainage, weight reduction, or the like, be provided with openings therethrough. Alternatively, the side panels can be in the nature of opposed framework supports. It is of course essential that there be sufficient structural integrity in the side panels to accommodate the pivot rod, locking pin and general structural integrity of the cradle.

While the cradle 18 of the alignment device 10 has been illustrated, in FIG. 1, as perpendicular to the overlying tongue 14 to allow for a lateral adjustment of the positioning thereof, it is to be appreciated that the cradle 18 can be positioned parallel to the overlying tongue, or at any angle between these two positions for movement of the tongue and associated hitch component as desired. This movement is effected in a manner whereby an infinite number of positions are achievable, either during a one-stage adjustment of the device or during the incremental manipulation thereof.

Figure 6:
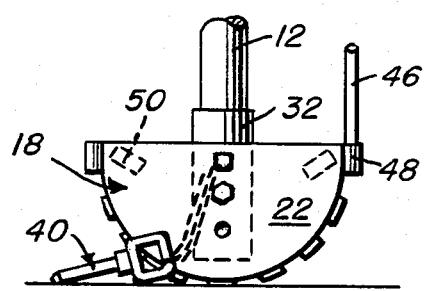
FIGS. 6–11 are sequential elevational views illustrating use of the device to incrementally move a mounted jack shaft and associated trailer assembly.
Figure 7:
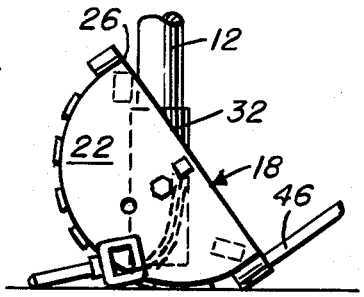

In operation, when it becomes necessary to align the hitch, or more particularly the trailer socket with the ball on a proximate tow vehicle, the locking pin 40 is removed and a handle introduced into one of the handle pockets toward the side of the device to which the trailer is to be shifted, for example, a base plate pocket 48 as shown in FIG. 6. An outward and downward force is then exerted on the handle 46 to roll the cradle 18 and move the jack socket 32, received jack shaft 12, and overlying trailer tongue in the direction of movement of the cradle. The rolling movement of the cradle in conjunction with the vertical orientation of the jack shaft is accommodated by the pivotal relationship between the cradle 18 and the jack socket 32. At all times, the load on the jack shaft is vertically aligned with the newly defined low point on the cradle base plate with the major load component being vertically directed to the ground. In this manner, the bias or tendency of the alignment device is to maintain its adjusted position. The rolling incremental movement of the cradle 18 is limited initially by engagement of the base plate pocket 48 with the ground, and more effectively by engagement of the jack shaft 12, or jack socket 32 if of a sufficient length, with the opposed or uppermost edge 26 of the base plate 20.

If the desired position for the trailer, and more particularly the hitch socket 16, is within the range of the first incremental movement of the device 10, the user need merely manipulate the jack to effect the desired hitch engagement, after which proper adjustment can be made to disengage the alignment device entirely from the jack shaft.

Figure 8:
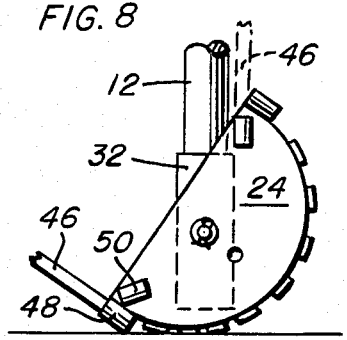
Figure 9:
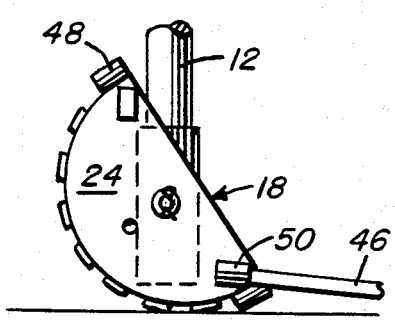
Figure 10:
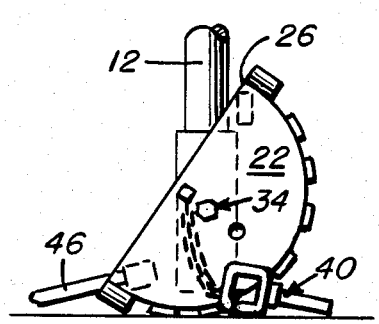
Figure 11:
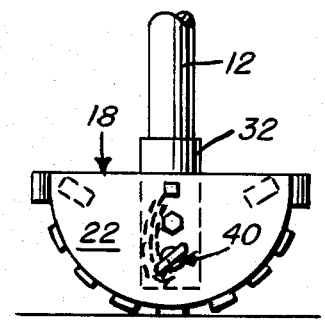

If, to the contrary, a further walking or incremental movement of the trailer is required, the device 10, again through the handle 46, is rotated, through any appropriate angle needed to again align the device with the desired direction of travel and with the uppermost portion of the rocked cradle forward. FIG. 8 illustrates a 180° repositioning of the cradle. The handle is then removed from the lower handle pocket and introduced into one of the now upwardly directed handle pockets, normally an angularly directed pocket 50 rigid with the rear side panel 24. The device, and more particularly the cradle 18, can now be rocked through an arc comprising a major portion of the length of the arcuate base plate 20, as suggested in FIG. 9. Further manipulation in this manner can continue as required, as suggested in FIG. 10. If the above described manipulation of the alignment device is to merely reposition the trailer, rather than as a step in the alignment and engagment of the hitch, the cradle will normally be brought to its neutral position, as illustrated in FIG. 11, and the locking pin reinserted whereby a highly stable support is provided without any danger of shifting or the like.

It should be appreciated that the construction of the device is such whereby even should the lock pin be pulled or inadvertently not inserted, any tendency for the trailer to roll or move would be resisted by the structural arrangement of the components, particularly in those instances wherein the base plate more closely approaches the pivot rod at the central area of the length thereof. In any event, should movement occur, this will be limited by an automatic locking of the cradle upon an end edge 26 of the base plate contacting the jack shaft. This safety feature or automatic position locking, when combined with an alignment device which can be readily and easily utilized to move a trailer by means of an efficient rolling or rocking action, is considered both highly advantageous and unique in the art.

I claim:

1. A trailer hitch alignment device including a generally arcuate, upwardly opening cradle defined by a pair of spaced side supports interconnected by a generally arcuate base, a jack socket pivotally mounted between said side supports within said cradle, said socket opening upwardly of said cradle and being dimensioned to receive the lower end of a conventional trailer jack shaft, and handle mounting means on said cradle for mounting one end of an elongated handle for a rocking manipulation of said cradle and a corresponding lateral movement of the pivotally mounted jack socket.

2. The alignment device of claim 1 wherein the pivotal mounting of the jack socket utilizes an elongated pivot rod extending transversely through the side supports and the jack socket therebetween, the opposed ends of said pivot rod being supported by said side supports.

3. The alignment device of claim 2 including locking means selectively locking said jack socket against pivotal movement with respect to said cradle, said locking means comprisng apertures through said side supports and jack socket, said apertures being alignable upon a central vertical positioning of the jack socket relative to the cradle, said locking means further comprising an elongated lock pin selectively insertable through said aligned apertures.

4. The alignment device of claim 3 wherein said base comprises opposed upwardly directed parallel end portions, said handle mounting means including a pair of pockets, one affixed to each of said upwardly directed end portions and opening upwardly relative thereto for selective reception of the handle means therein.

5. The alignment device of claim 4 wherein said handle mounting means further includes a pair of pockets affixed to one of said side supports and generally laterally aligned with the base pockets, each side support pocket being inclined relative to the corresponding base pocket and opening upwardly for the selective reception of the handle means therein.

6. The alignment device of claim 5 wherein the upwardly directed parallel end portions of said base define abutment means limiting pivotal movement of the cradle relative to a jack socket supported jack shaft.

7. The alignment device of claim 6 wherein each of said pockets is in the nature of a hollow sleeve with an open lower end.

8. The alignment device of claim 7 including drainage openings in selected portions of said base.

9. The alignment device of claim 2 wherein said base includes upwardly directed parallel end portions, said handle mounting means including first upwardly opening pockets affixed to each of said end portions and second pockets generally aligned with the first pockets and secured to an adjoining side support, each of said side support pockets being angularly directed relative to the base pockets, said side support pockets opening upwardly and outwardly.

10. The alignment device of claim 9 wherein each of said pockets is in the nature of a hollow sleeve with an open lower end.

11. The alignment device of claim 2 wherein the upwardly directed parallel end portions of said base define abutment means limiting pivotal movement of the cradle relative to a jack socket supported jack shaft.

* * * * *